United States Patent
Nagura et al.

(10) Patent No.: US 11,486,800 B2
(45) Date of Patent: Nov. 1, 2022

(54) SAMPLE DISPERSING DEVICE

(71) Applicant: HORIBA, LTD., Kyoto (JP)

(72) Inventors: Makoto Nagura, Kyoto (JP); Kazuma Aoyagi, Kyoto (JP); Akihiro Minami, Kyoto (JP); Hiroshi Tateno, Kyoto (JP); Tomoya Shimizu, Kyoto (JP); Kusuo Ueno, Kyoto (JP)

(73) Assignee: HORIBA, LTD., Kyoto (JP)

( * ) Notice: Subject to any disclaimer, the term of this patent is extended or adjusted under 35 U.S.C. 154(b) by 352 days.

(21) Appl. No.: 16/644,305

(22) PCT Filed: Sep. 10, 2018

(86) PCT No.: PCT/JP2018/033490
§ 371 (c)(1),
(2) Date: Mar. 4, 2020

(87) PCT Pub. No.: WO2019/050035
PCT Pub. Date: Mar. 14, 2019

(65) Prior Publication Data
US 2021/0088423 A1 Mar. 25, 2021

(30) Foreign Application Priority Data
Sep. 11, 2017 (JP) .............................. JP2017-173924

(51) Int. Cl.
*G01N 1/28* (2006.01)
*G02B 21/34* (2006.01)
*G01N 1/38* (2006.01)

(52) U.S. Cl.
CPC ............ *G01N 1/2813* (2013.01); *G01N 1/286* (2013.01); *G02B 21/34* (2013.01); *G01N 1/38* (2013.01)

(58) Field of Classification Search
CPC ........ G01N 1/2813; G01N 1/286; G01N 1/38; G02B 21/34
See application file for complete search history.

(56) References Cited

U.S. PATENT DOCUMENTS 3,461,268 A  8/1969 Inoue
3,472,202 A  10/1969 Todd
(Continued)

FOREIGN PATENT DOCUMENTS

CN  101324490 A  12/2008
CN  104421088 A  3/2015
(Continued)

OTHER PUBLICATIONS

Extended European Search Report for the corresponding European Application No. 18854128.8 dated Apr. 13, 2021.
(Continued)

*Primary Examiner* — Nicole M Ippolito
*Assistant Examiner* — Hanway Chang
(74) *Attorney, Agent, or Firm* — Lucas & Mercanti, LLP

(57) ABSTRACT

A sample dispersing device contains a container inside of which a dispersal chamber where a power sample is dispersed is formed, and an introducing mechanism that introduces a gas containing the powder sample from the outside of the container into the dispersal chamber based on a pressure difference between the inside and the outside of the container. The introducing mechanism contains an introduction pipe where the gas containing the powder sample flows, and several restrictors arranged in the introduction pipe.

10 Claims, 7 Drawing Sheets

(56) References Cited

U.S. PATENT DOCUMENTS

| | | | |
|---|---|---|---|
| 4,868,128 | A | 9/1989 | Sommer et al. |
| 2010/0326213 | A1 | 12/2010 | Davidson et al. |
| 2011/0120368 | A1 | 5/2011 | Chapeau et al. |
| 2017/0045426 | A1 | 2/2017 | Ueno et al. |

FOREIGN PATENT DOCUMENTS

| | | |
|---|---|---|
| CN | 204412414 U | 6/2015 |
| CN | 205099393 U | 3/2016 |
| EP | 0670484 A1 | 9/1995 |
| GB | 2522735 A | 8/2015 |
| JP | S52-096331 U | 7/1977 |
| JP | S55-47645 Y2 | 11/1980 |
| JP | S61-173132 A | 8/1986 |
| JP | S63-502213 A | 8/1988 |
| JP | H08-201268 A | 8/1996 |
| JP | H11-337469 A | 12/1999 |
| JP | 2001242062 A | 9/2001 |
| JP | 3530453 B2 | 5/2004 |
| JP | 2010527455 A | 8/2010 |
| WO | 2008142387 A | 11/2008 |
| WO | 2015159870 A1 | 10/2015 |

OTHER PUBLICATIONS

International Search Report dated Nov. 27, 2018 for PCT/JP2018/033490 and English translation.
JPO, Notice of Allowance for the corresponding Japanese patent application No. 2019-541048, dated Jun. 8, 2021, with English translation.
Office Action dated Sep. 2, 2022 for the corresponding Chinese patent application No. 201880058069.6, with English translation.
Office Action dated Sep. 8, 2022 for the corresponding European patent application No. 18854128.8.

SAMPLE DISPERSING DEVICE

CROSS REFERENCE TO RELATED APPLICATION

This Application is a 371 of PCT/JP2018/033490 filed on Sep. 10, 2018 which, in turn, claimed the priority of Japanese Patent Application No. 2017-173924 filed on Sep. 11, 2017, both applications are incorporated herein by reference.

FIELD OF THE ART

This invention relates to a sample dispersing device that prepare a measurement sample to make an observation by devices such as an electron microscope such as an SEM (Scanning Electron Microscope), an optical microscope, and a Raman microscope.

BACKGROUND ART

Conventionally, in case of observing a powder sample by a microscope or the like, a measurement sample is prepared by dispersing particles of the powder sample uniformly on a sample plate.

A sample dispersing device to prepare the measurement sample comprises a container inside of which is kept at a predetermined vacuum degree and inside of which the sample plate is placed and an introducing mechanism that introduces the powder sample into a sample dispersal chamber based on a pressure difference between the inside and the outside of the container.

For example, for the sample dispersing device indicated in the patent document 1, the introducing mechanism of the powder sample comprises a introducing tube arranged to penetrate through the inside and the outside of the container, a powder sample hopper arranged in a proximal end part of the introducing tube as being an outside of the container, a jet outlet part that is formed at a distal end part of the container in the introducing tube and that is expanded toward an opening part in a trumpet shape, a diffuser arranged inside of the jet outlet part and a valve that opens/closes the container arranged in the introducing tube.

The introducing mechanism is so configured that the valve is open when the inside of the container is sufficiently decompressed in a state wherein the valve is closed and then the powder sample is jetted from the jet outlet part due to the pressure difference between the inside and the outside of the container. Further, the clumped powder group in the power sample is crushed into pieces by the powder sample that is jetted from the jet outlet part and that crushes against the diffuser so that a uniform dispersed state is attained.

However, since the analysis is conducted with a further improved resolution due to improvement of recent image analysis technique, a standard of the dispersibility of the particles required for the measurement sample is higher than the conventional standard and it is getting difficult for the sample dispersing device having the above arrangement to satisfy the requirement.

PRIOR ART DOCUMENTS

Patent Document

Patent document 1: Japanese Unexamined Patent Application Publication No. 3530453

SUMMARY OF THE INVENTION

Problems Solved by the Invention

This invention intends to solve the above-mentioned problems and an object of this invention is to provide a sample dispersing device that can disperse a powder sample uniformly in a further improved standard than a conventional sample dispersing device.

Means to Solve the Problems

More specifically, a sample dispersing device in accordance with this invention comprises a container inside of which a dispersal chamber where a powder sample is dispersed is formed, and an introducing mechanism that introduces a gas containing the powder sample from the outside of the container into the dispersal chamber based on a pressure difference between the inside and the outside of the container, and is characterized by that the introducing mechanism comprises an introduction pipe where the gas containing the power sample flows, and several restrictors arranged in the introduction pipe.

In accordance with this invention, the gas containing the powder sample is at leased compressed and the acceleration of the fluid changes every time when the gas passes the several restrictors, and then a shearing force is applied to the particle of the powder sample in the gas. As a result of this, it is possible to repeatedly apply a force in a direction to separate each particle at several times to the clumped particle group in the powder sample so as to disperse the clumped particle group to particles.

In addition, even though there is some particle group that is kept in the clumped state without sufficiently being dispersed, it is highly possible that the particle group in the clumped state is much more adsorbed by the introduction pipe or a wall surface of the restrictor in case of passing the several restrictors compared with the dispersed particles. As a result of this, it is possible also to produce a filter effect by which the dispersed particle more easily passes through each restrictor than the clumped particle group during a process of passing through each restrictor by the arrangement having several restrictors.

Based on the above, since it is possible to make it more difficult for the particle group in the clumped state to be introduced into the dispersal chamber and to increase a ratio of the dispersed particles compared with a conventional arrangement, it is possible to obtain the dispersibility of the particle required for, for example, the measurement sample used for microscope or the like.

In order to make it more easy to disperse the particle group in the clumped state by the arrangement wherein the gas containing the powder sample is repeatedly compressed and expanded every time when the powder sample passes the several restrictors and the shearing force is applied to the particle group in a largely changed state, the sample dispersing device may be so arranged that a flow channel diameter is enlarged after a fluid passes the several restrictors in the introduction pipe, or after the flow channel diameter becomes the minimum in case that the fluid passes the several restrictors.

In order to prevent the uniformity of the measurement sample in the dispersal chamber from being damaged because the gas that does not contain the powder sample is introduced into the dispersal chamber after the powder sample is introduced into the dispersal chamber and the particles are thrown up in the dispersal chamber, the sample dispersing device may further comprise a decompressor that decompresses the inside of the dispersal chamber, and the introducing mechanism may further comprise a sample chamber inside of which the power sample and a predetermined volume of the gas are housed in a state before the powder sample is introduced into the dispersal chamber, and a partition structure that separates the sample chamber and the dispersal chamber with a partition in a state before the powder sample is introduced into the dispersal chamber and that opens the partition between the sample chamber and the dispersal chamber in case that the powder sample is introduced.

Since the conventional sample dispersing device has a valve to separate between the inside of the container and the outside thereof, however, there is a problem that a part of the powder sample gets stuck in the valve or the valve is polluted by the powder sample. In order not to provide the valve in the introducing mechanism so as not to cause the problem, the partition structure may comprise a partition film that blocks an introducing aperture that is formed on the container and through which the power sample is introduced, and the introducing mechanism may comprise an elastic partition wall body that is arranged on the outside of the container and inside of which the sample chamber is formed, and a film release member that is arranged on the inside of the elastic partition wall body and that contacts and breaks the partition film by transforming the elastic partition wall body. In addition, in accordance with this arrangement, since it is possible to make the structure to break the partition film without a mechanical movable part or a mechanical sliding part or a gap, the device can be free from being contaminated by the powder sample that enters the device. Furthermore, since contamination is not likely occur due to residual of the powder sample, it is possible to reduce labor and time for cleaning or maintenance compared with a conventional arrangement.

In order both to reduce a preparation work to introduce the powder sample into the dispersal chamber and to easily form the sample chamber having a predetermined volume on the outside of the container, the partition structure may comprise a fixing member that is mounted on the outside of the container and that sandwiches a peripheral part of the partition film between a circumferential area of the introducing aperture and the fixing member, a through bore that is formed on the fixing member to face the introducing aperture in a state wherein the fixing member is mounted on the container, and an engaging projection that is formed on a circumference of an opening of the through bore locating on an opposite side to the container and that makes an engagement with an inner side surface of the elastic partition wall body.

As a concrete arrangement that is suitable for repeating compression and expansion of the gas containing the powder sample represented is that the several restrictors are nozzles that have a predetermined length in a direction of a flow and that have a part whose flow channel diameter decreases as going from a proximal end side of the introducing tube to a distal end thereof.

In order to jet the powder sample in a spray state into the dispersal chamber after there is no powder sample in the clumped state in the dispersal chamber, one of the several restrictors may form an exhaust nozzle of the power sample in the dispersal chamber.

In order to make it possible to prepare the measurement sample for, for example, a microscope by efficiently collecting the dispersed powder sample in the dispersal chamber, the sample dispersing device may further comprise a voltage applying mechanism that is arranged in the dispersal chamber and that applies a voltage whose potential is reverse to that of the powder sample to a collecting member that collects the powder sample.

In order to improve the uniformity of the dispersed particles by making it easy for the clumped particles to pass the several restrictors, at least one of the several restrictors may be arranged in the introducing tube in a manner that a center axis of the restrictor is deviated from that of the other restrictors.

In order to make it difficult for the clumped particles whose particle diameter is larger than a predetermined value to pass the introducing tube and to reach the dispersal chamber, at least one of the several restrictors may be a cylindrical shape whose distal end part is blocked and an aperture is formed on a side surface of the cylindrical shape.

Effect of the Invention

In accordance with the sample dispersing device of this invention, since the several restrictors are arranged in the introducing tube, it is possible to disperse the clumped particle group by applying a shearing force multiple times to the clumped particle group in the powder sample. In addition, the particle group whose diameter is big in the clumped state is more likely to be caught by the introducing tube or the surface of the restrictors in case of passing the several restrictors compared with the dispersed particles. As a result of this, it becomes possible to improve the dispersibility of the powder sample introduced into the dispersal chamber.

DESCRIPTION OF THE REFERENCE NUMERALS

Figure 1:
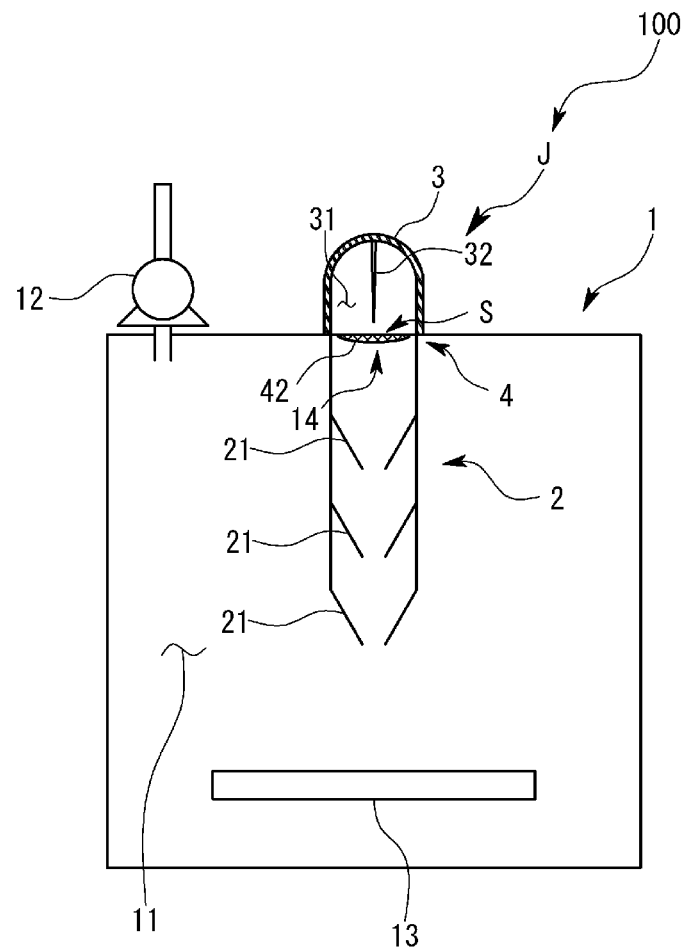
FIG. 1 A schematic view of a sample dispersing device in accordance with one embodiment of this invention.

100 . . . sample dispersing device
1 . . . container
11 . . . dispersal chamber
12 . . . decompressor
13 . . . holding member
14 . . . introducing aperture
J . . . introducing mechanism
2 . . . introducing tube 21 . . . nozzle (restrictor)
3 . . . elastic partition wall body
31 . . . sample chamber
32 . . . needle (film release member)
4 . . . partition structure
41 . . . base part
42 . . . partition film
43 . . . fixing member
51 . . . seal member
52 . . . circle groove
53 . . . projecting part
54 . . . through bore
55 . . . doughnut-like groove
56 . . . engaging projection
S . . . powder sample

MODE FOR EMBODYING THE INVENTION

A sample dispersal device 100 in accordance with a first embodiment of this invention will be explained with reference to each drawing.

The sample dispersal device 100 of the first embodiment is to prepare a measurement sample to measure or monitor a state of a particle by, for example, an electron microscope, an optical microscope or the Raman microscope. The measurement sample is held as a particle on a holding member 13 such as a glass plate in a state wherein a clumped particle group contained in a powder sample (S) is dispersed by the sample dispersing device 100.

As shown in FIG. 1 and FIG. 2, the sample dispersing device 100 of the first embodiment comprises a container 1 inside of which the powder sample (S) is dispersed and an introducing mechanism (J) that introduces the powder sample (S) from the outside of the container 1 to the inside of the container 1.

The container 1 forms a dispersal chamber 11 inside of which the powder sample (S) is dispersed and is generally a hollow cylindrical shape. In addition, the container 1 comprises a decompressor 12 that decompresses the inside of the container 1 to a predetermined pressure that is lower than an atmospheric pressure. On a top panel of the container 1 formed is an introducing aperture 14 to introduce the powder sample (S) from the outside of the container 1 to the inside of the dispersal chamber 11 locating on the inside of the container 1 through the introducing mechanism (J).

The introducing mechanism (J) introduces the powder sample (S) from the outside of the container 1 to the inside thereof based on a pressure difference between the inside and the outside of the container 1. The introducing mechanism (J) comprises a partition structure 4 that blocks the introducing aperture 14 of the container 1, an elastic partition wall body 3 that forms a sample chamber 31 where the power sample (S) is housed in a state prior to introducing the powder sample (S) into the dispersal chamber 11 and an introducing tube 2 that is arranged on the inside of the container 1 and where the gas containing the powder sample (S) that has passed the introducing aperture 14 of the container 1 flows. The introducing tube 2 is provided with several nozzles 21 as a restrictor so that a flow of the gas containing the power sample (S) repeats compression and expansion at several times. A shearing force is applied to the clumped particle group by means of the powder sample (S) that passes through the several nozzles 21 so that the clumped particle group is dispersed into each particle.

Next, the introducing mechanism (J) will be explained in detail with referring to FIG. 1 through FIG. 4. FIG. 3 is a perspective view showing a detail of the introducing mechanism (J) formed on the outside of the container 1, and FIG. 4 is a perspective view showing an exploded state of the introducing mechanism (J).

The partition structure 4 comprises, as shown in FIG. 3 and FIG. 4, a base part 41 as being a circumferential part of the introducing aperture 14 on the outside surface of the container 1, a partition film 42 that is arranged to block the introducing aperture 14 and a disk-shaped fixing member 43 with which the partition film 42 is fixed to the base part 41 by placing an outer circumferential part of the partition film 42 between the base part 41 and the fixing member 43.

As shown in FIG. 4, a circular groove 52 into which a ring-shaped seal member 51 is inserted is formed around the introducing aperture 14 and several screw holes to fix the fixing member 43 to the base part 41 by screws are annularly arranged around the introducing aperture 14. In addition, a projecting part 53, one part of which projects to the outside in a form of a flat cylinder shape, is formed around the introducing aperture 14.

The partition film 42 is a circular thin film made of, for example, a transparent resin, and is placed between the base part 41 and the fixing member 43, and has strength in such an unbreakable degree even though the inside of the container 1 is decompressed to a predetermined vacuum degree by the decompressor 12 in a state wherein the introducing aperture 14 is blocked.

The fixing member 43 has a through bore 54 whose diameter is almost the same as an outer diameter of the projecting part 53 of the base part 41 on a center part of the fixing member 43, and is mounted on the base part 41 by fittingly inserting the projecting part 53 into the through bore 54 in a state wherein the partition film 42 is arranged above the projecting part 53. In addition, the partition film 42 is sandwiched between a back side surface of the fixing member 43 and the base part 41 by mounting the fixing member 43 on the base part 41, and the fixing member 43 is formed to be flat so as to press and crush the seal member 51 that is inserted into the circular groove 52. Namely, an opening of the through bore 54 in the partition film 42 side faces the introducing aperture 41 of the container 1 through the partition film 42 in a state wherein the fixing member 43 is fixed to the base part 41.

Furthermore, on a front side surface of the fixing member 43, a doughnut-like groove 55 is formed to surround the through bore 54 and a thin cylindrical engaging projection 56 is formed to separate the through bore 54 and the doughnut-like groove 55. The elastic partition wall body 3 is mounted on the engaging projection 56 by fittingly inserting the inner peripheral surface of the elastic partition wall body 3 over the outside peripheral surface of the engaging projection 56.

The sample chamber 31 is, as shown in FIG. 1, a space formed between the elastic partition wall body 3 mounted on the fixing member 43 and the partition film 42, and is a space where the powder sample (S) and a predetermined volume of the gas are housed in a state before the powder sample (S) is introduced into the dispersal chamber 11. The sample chamber 31 is formed by mounting the elastic partition wall body 3 on the partition structure 4 so as to cover the circumference of the introducing aperture 14 of the container 1. In the first embodiment, the powder sample (S) is placed over the partition film 42 through the through bore 54 of the fixing member 43 in a state wherein the partition film 42 is sandwiched between the base part 41 and the fixing member 43, and then the elastic partition wall body 3 is mounted on the engaging projection 56 of the fixing member 43.

Figure 2:
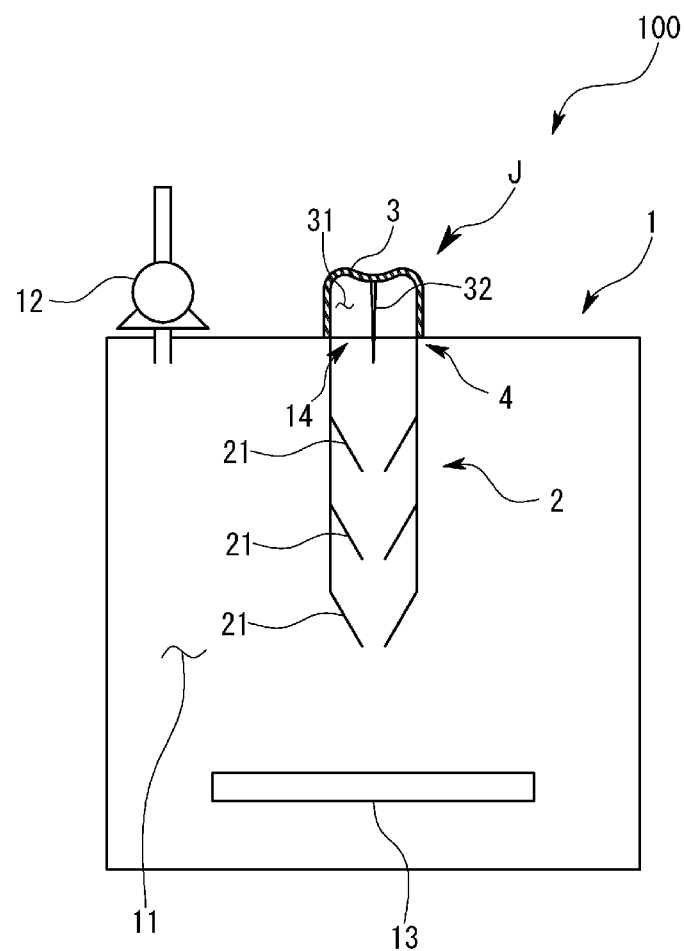
FIG. 2 A schematic view showing a state of the sample dispersion device at a time of initiating dispersion in accordance with this embodiment.

The elastic partition wall body 3 is, as shown in FIG. 1 through FIG. 4, generally a hemispherical shell shape having a flange in an opening side. The elastic partition wall body 3 is made of, for example, rubber and can be dented to the inside by hand. The needle 32 as being a film release member is arranged on an inside surface of a top face of the elastic partition wall body 3 toward the opening side. A length of the needle 32 is so set that a distal end of the needle 32 is separated from the partition film 42 by a predetermined distance in a natural state wherein both the elastic partition wall body 3 is fittingly inserted over the engaging projection 56 of the fixing member 43 and the elastic partition wall body 3 is not transformed. More specifically, as shown in FIG. 2, the partition film 42 is broken when the distal end of the needle 32 makes contact with the partition film 42 and penetrates the partition film 42 by pushing the top face side of the elastic partition wall body 3 toward the partition film 42 side. As a result of this, the powder sample (S) placed on the partition film 42 is introduced into the introducing tube 2 in the container 1. In addition, since the inside of the container 1 is kept to be at a predetermined vacuum degree, the elastic partition wall body 3 is dent toward the introducing aperture 14 side of the container 1 after the partition film 42 is broken and acts so as to close the introducing aperture 14. As a result of this, the gas of more than or equal to a volume housed in the sample chamber 31 is not introduced into the container 1 after the partition film 42 is broken.

A proximal end side opening of the introducing tube 2 is, as shown in FIG. 1 and FIG. 2, mounted on an inside top face of the container 1 to cover a circumference of the introducing aperture 14 of the container 1. Three nozzles 21 having the same shape are coaxially arranged in line for the introducing tube 2. One nozzle 21 is a distal end opening of the introducing tube 2 and also serves as a jet nozzle that jets the powder sample (S) into the dispersal chamber 11.

Each of the nozzles 21 is a tapered nozzle and is so configured that a flow channel diameter of the introducing tube 2 enlarges after the flow channel diameter becomes the minimum viewed as a whole of the introducing tube 2. More specifically, the gas is repeatedly compressed and expanded every time when the gas passes each of the nozzles 21. In addition, two nozzles 21 in the middle part of the introducing tube 2 are so arranged that a distal end part of the nozzle 21 is separated by a predetermined distance from a proximal end part of the subsequently arranged nozzle 21.

Next, an operation of the sample dispersing device 100 having the above-mentioned arrangement will be explained.

Figure 4:
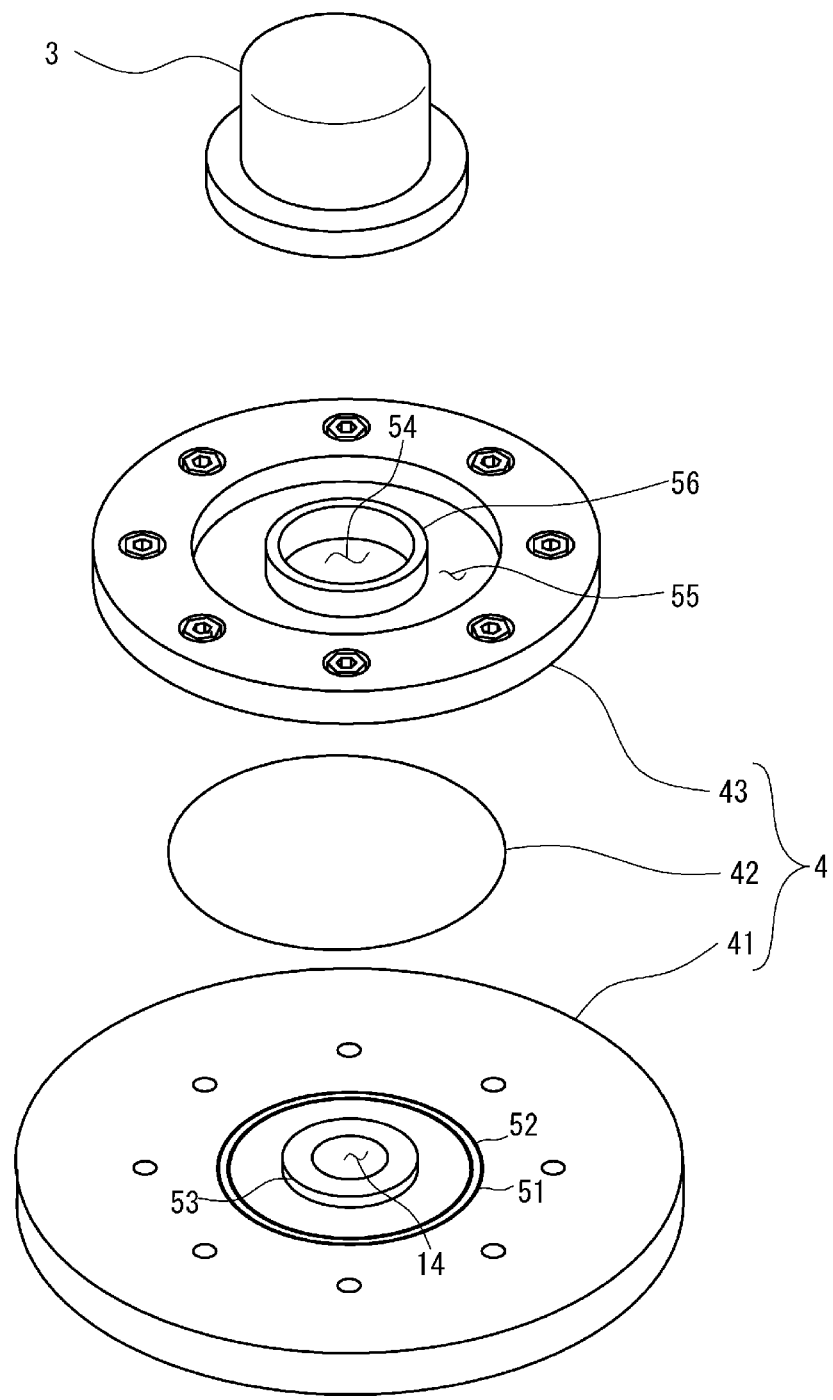
FIG. 4 A schematic exploded perspective view showing an exploded state of the introducing mechanism in accordance with this embodiment.

First, as shown in FIG. 4, the partition film 42 is arranged to block the introducing aperture 14 of the container 1, the fixing member 43 is placed over the partition film 42, the partition film 42 is sandwiched between the fixing member 43 and the base part 41 and then the partition film 42 is fastened to the base part 41 and the fixing member 43 with bolts.

Figure 3:
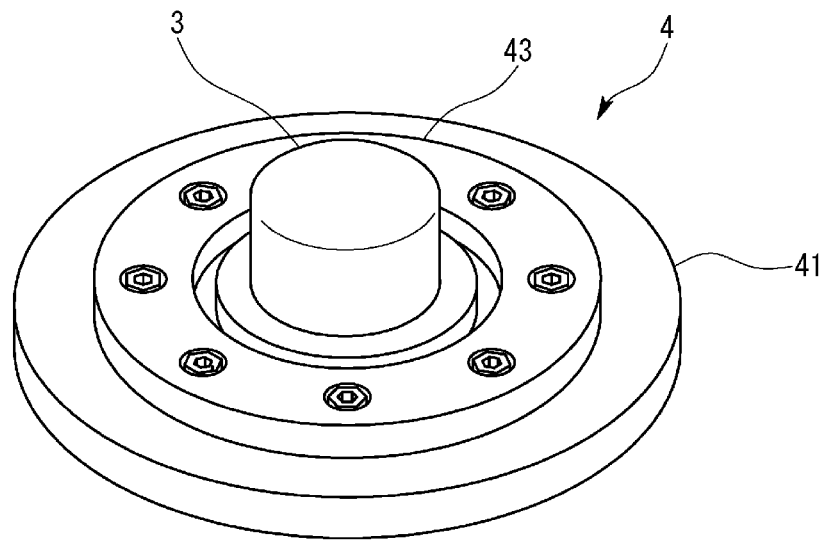
FIG. 3 A schematic perspective view showing an introducing mechanism of this embodiment.

Next, the powder sample (S) is placed on the partition film 42 through the through bore 54 of the fixing member 43, and then, as shown in FIG. 3, the elastic partition wall body 3 is fittingly inserted over the engaging projection 56 of the fixing member 43.

Then, the pressure in the dispersal chamber 11 formed inside of the container 1 is reduced so as to be in a predetermined vacuum degree. After completion of decompression, as shown in FIG. 2, a user pushes the top face part of the elastic partition wall body 3 toward the partition film 42 side until the needle 32 breaks the partition film 42. In order to break the partition film 42, all required is just transform the elastic partition wall body 3 and there is neither machine having a sliding moving part nor a gap in the sample chamber 31. With this arrangement, there is no chance that power sample (S) gets stuck in the gap even though the partition film 42 is broken so that it is possible to prevent the circumference of the sample chamber 3 from being polluted. As this result, this sample dispersion device 100 requires less time and effort for cleaning the circumference of the sample chamber 3 after completion of the dispersion compared with a conventional arrangement.

Since it is the atmospheric pressure in the sample chamber 31 and a predetermined vacuum degree in the dispersal chamber 11, the powder sample (S) placed on the partition film 42 passes the introducing tube 2 and then is sucked into the dispersal chamber 11 together with the predetermined volume of the gas housed in the sample chamber 31 due to the pressure difference between the inside and the outside of the container 1.

The gas containing the powder sample (S) passes the several nozzles 21 in case of flowing in the introducing tube 2. In this case, every time the gas passes the nozzle 21, the flow channel diameter expands or contracts and a shearing force is applied to the particle group in a clumped state due to the acceleration change so that the shearing force acts on the particle group to disperse. In addition, some powder sample (S) whose diameter is especially big in the clumped state might fail to reach a subsequent nozzle 21 because the powder sample (S) resides in a space between each of the two adjacent nozzles 21, 21 or is collected by a wall surface of the nozzle 21 or the introducing tube 2. More specifically, during a process while the powder sample (S) flows in the introducing tube 2, some clumped powder sample (S) that fails to be dispersed is difficult to be jetted from the exhaust outlet of the nozzle 21 arranged in the distal end of the introducing tube 2 into the dispersal chamber 11.

The particles jetted from the exhaust outlet of the nozzle 21 into the dispersal chamber 11 drop downward and are collected on the surface of the collecting member arranged in the dispersal chamber 11. After the inside of the container 1 is exposed to the atmosphere, the collecting member that collects the particles of the powder sample (S) is taken out from the inside of the container 1 and is used as a measurement sample by a microscope or the like.

In accordance with the sample dispersing device 100 of the first embodiment, since the several nozzles 21 are arranged in the introducing tube 2 so as to configure a multi-stage nozzle, a flow of the gas containing the powder sample (S) is expanded and contracted repeatedly at several times due to the several nozzles 21 and the shearing force is applied to the particles at several times so as to disperse the particles. As this result, it is possible to disperse the particle group in the clumped state more evenly and minutely compared with a conventional arrangement.

In addition, the particle group whose diameter remains big due to failure of dispersion among the particle groups in the clumped state tends to reside in the space between each of the adjacent nozzles 21 and the multi-stage nozzle functions as a kind of a filter. Then, the particle group kept in the clumped state is difficult to be jetted from the exhaust outlet of the nozzle 21 arranged at the distal end of the introducing tube 2 compared with the particle that is well dispersed. As a result of this, it is possible to increase a ratio of the dispersed particle in the dispersal chamber 11 so that the dispersibility of the powder sample (S) can be increased.

Furthermore, since the sample chamber 31 where only the predetermined volume of the gas is housed by the elastic partition wall body 3 is formed in a state prior to initiation of introduction of the powder sample (S), it is possible to introduce the gas whose amount is suitable for promoting the dispersion of the powder sample (S) according to a characteristic of the powder sample (S) into the dispersal chamber 11. In addition, since the elastic partition wall body 3 is just fittingly inserted over the engaging projection 56 of the fixing member 43, if the elastic partition wall bodies 3 having several different kinds of an internal volume are prepared, it is also possible to change an amount of the gas that flows into the dispersal chamber 11 at a time of introducing the gas into the dispersal chamber 11 according to a kind of the powder sample (S).

In addition, since the elastic partition wall body 3 blocks the introducing aperture 14 after the partition film 42 is broken, it is possible to prevent the gas whose amount is equal to or more than necessary for dispersion from flowing from the atmosphere side into the dispersal chamber 11. Then, there is no chance that the particle of the powder sample (S) that flows into the dispersal chamber 11 is curled up due to a gas flowing in from the atmosphere side and that the dispersibility is impaired. This reason is that the needle 32 to break the partition film 42 is provided on the inside of the elastic partition wall body 3 and there is no need of dismounting the elastic partition wall body 3 from the fixing member 43 in order to break the partition film 42.

Figure 5:
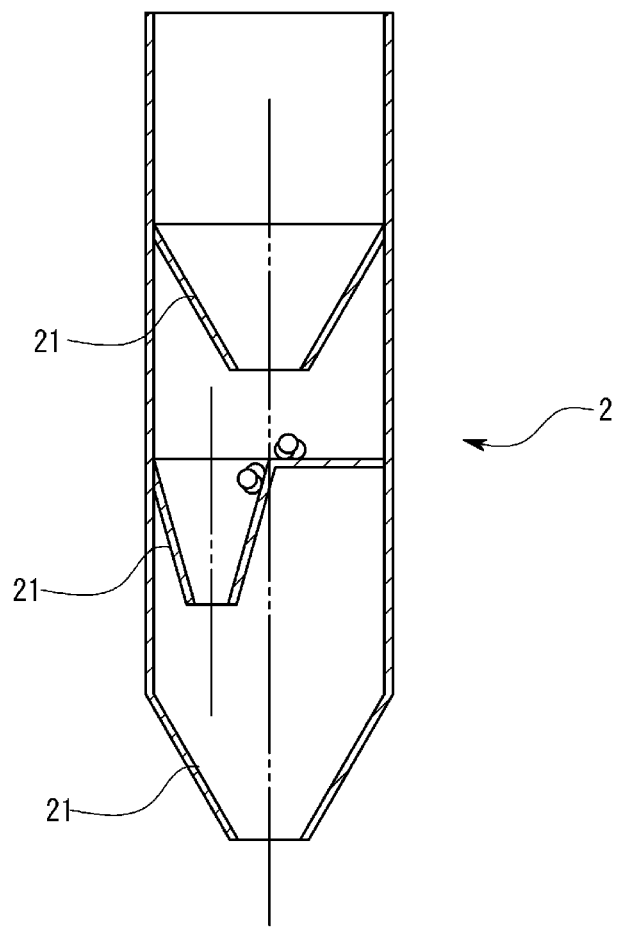
FIG. 5 A schematic cross-sectional view showing a structure of the introducing mechanism of the sample dispersing device in accordance with a second embodiment of this invention.
Figure 6:
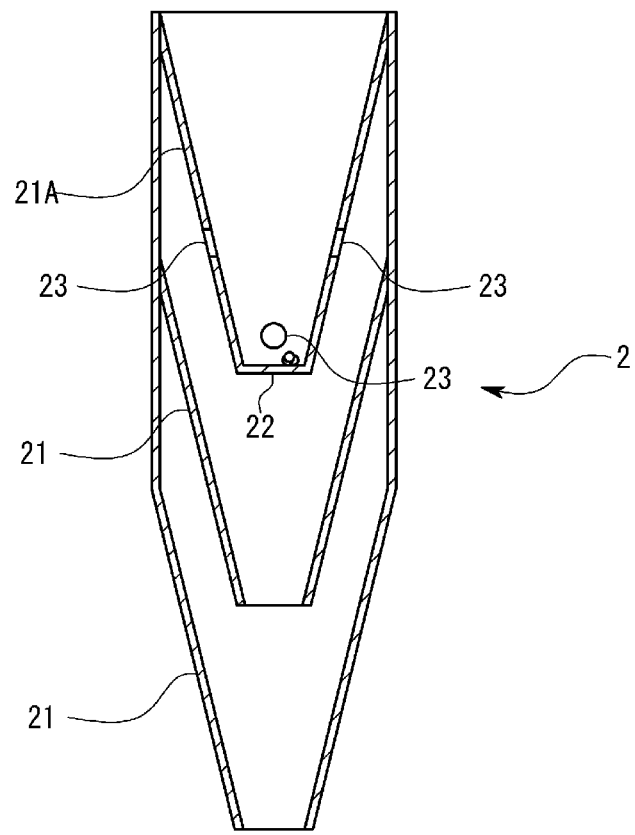
FIG. 6 A schematic cross-sectional view showing a structure of the introducing mechanism of the sample dispersing device in accordance with a third embodiment of this invention.
Figure 7:
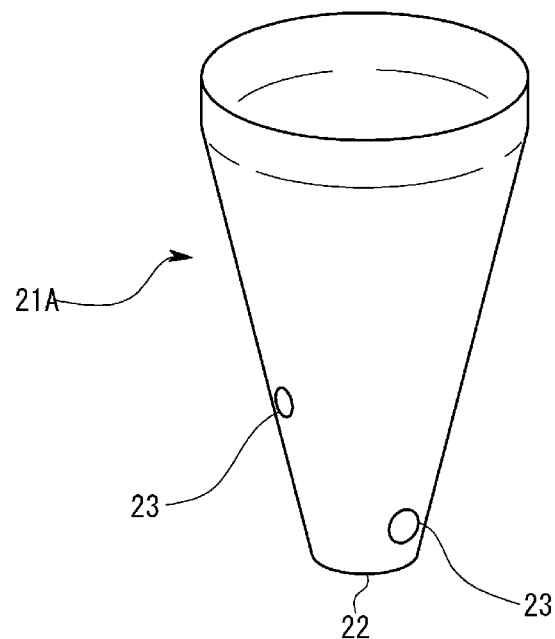
FIG. 7 A schematic perspective view showing a structure of the introducing mechanism of the sample dispersing device in accordance with the third embodiment of this invention.

A sample dispersing device 100 in accordance with a second embodiment of this invention will be explained with reference to FIG. 5. The same parts as those in the second embodiment are denoted by the same reference numerals as those in the first embodiment.

The sample dispersing device 100 of the second embodiment is different from the sample dispersing device 100 of the first embodiment in that an arrangement of the several nozzles 21 as being the several restrictors arranged in the introducing tube 2. More specifically, as shown in FIG. 5, while a center axis of the nozzle 21 of the first step coincides with a center axis of the nozzle 21 of the third step, a center axis of the nozzle 21 of the second step does not coincide with the center axis of other nozzle 21. More concretely, while the nozzle 21 of the first step and the nozzle 21 of the third step are arranged so that the center axes of both nozzles 21 coincide with a center axis of the introducing tube 2, the nozzle 21 of the second nozzle 21 is arranged in a shifted manner to an outer circumferential side from a center axis of the introducing tube 2. In order to attain this arrangement, a supporting surface 21S that expands to a direction crossing the center axis is formed to support the nozzle 21 of the second step in the introducing tube 2.

In accordance with the sample dispersing device 100 of the second embodiment having the above arrangement, since the center axis of the nozzle 21 of the second step is deviated from those of the other nozzles 21, the clumped particle whose diameter is big and that passes the nozzle 21 of the first step easily crushes against the wall surface or the supporting surface 21S of the nozzle 21 of the second step. In addition, it is possible also for the clumped particle that passes the nozzle 21 of the second step to easily crush against the wall surface of the nozzle 21 of the third step.

According to these, it is possible to increase a probability of crashing the clumped particles against the wall surface of the nozzles 21 while the particles pass the introducing tube 2, and to further improve the dispersible effect.

Next, a sample dispersing device 100 in accordance with a third embodiment of this invention will be explained with reference to FIG. 6 and FIG. 7. The same parts as those in the third embodiment are denoted by the same reference numerals as those in the first embodiment.

The sample dispersing device 100 of the third embodiment is different from the sample dispersing device 100 of the first embodiment in that one of the several nozzles arranged in the introducing tube 2 is a nozzle 21A having a tubular shape whose distal end part is blocked and whose side surface is provided with a bore 23.

More specifically, in stead of the nozzle 21 of the first step in the first embodiment, the third embodiment comprises the distal end blocked nozzle 21A having a clumped particle collecting part 22 whose distal end part has a generally truncated cone shape and is blocked and several bores 23 that open toward a side surface.

In accordance with the sample dispersing device 100 of the third embodiment, since an effect of the gravity is bigger than a suction force by the bores 23 for the clumped particles whose particle diameter is bigger than a predetermined value, the clumped particles are collected by the clumped particle collecting part 22 so that the clumped particles fail to proceed to the nozzle 21 of the second step. In addition, since the effect of the gravity is smaller than the suction force by the bores 23 for the particles that are fully dispersed, it is possible for the fully dispersed particles to pass the bores 23 and to reach the nozzles 21 of the second step and the third step.

As mentioned, in accordance with the sample dispersing device 100 of the third embodiment, the clumped particles are difficult to reach the inside of the dispersal chamber 11 so that it becomes possible to disperse the particles having a uniform particle diameter in the dispersal chamber 11. Furthermore, even though the clumped particles that attach to the elastic partition wall body 3 drop due to the effect of the gravity in case of dismounting the container 1 after the particles are dispersed on the holding member 13, it is possible to collect the clumped particles by the clumped particle collecting part 22. Then, it is possible to prevent renewed particles from attaching to the holding member 13 in case of dismounting the holding member 13 so that uniformity of the particle diameter can be kept.

Other embodiment will be explained.

In the above-mentioned embodiment, the introducing mechanism is so configured that the powder sample is introduced into the container by means of the pressure difference between the inside and the outside of the container by making the inside of the sample chamber the atmospheric pressure and the inside of the dispersal chamber the negative pressure, however, the powder sample may be introduced from the sample chamber into the dispersal chamber by creating the pressure difference by applying the pressure to the sample chamber so as to make the pressure in the sample chamber higher than the pressure in the dispersal chamber.

In addition, if there is no problem in dispersing the powder sample or collecting the dispersed particles even though the gas continuously flows from the atmosphere side into the dispersal chamber of the container, both a sample chamber and an elastic partition wall body may be omitted. More specifically, the sample dispersing device may comprise a container and an introducing tube to introduce the powder sample into the container, and the introducing tube may be provided with several restrictors such as nozzles.

In addition, the restrictor is not limited to the tapered nozzle, and may be, for example, a Laval nozzle (a tapered divergent nozzle). More specifically, the restrictor arranged in the introducing tube is not only a restrictor wherein the gas is compressed and expanded before and behind the nozzle but also a restrictor wherein the gas is compressed and expanded while the gas passes the nozzle. An interval between the nozzles is not limited to the above-mentioned, and each nozzle may be overlapped with a narrow interval between nozzles viewed from a direction orthogonal to the flow direction.

In addition, the restrictor is not limited to the nozzle and may be an orifice. Furthermore, a shape of the restrictor may not be the same and each restrictor having different characteristic may be arranged in the introducing tube. In addition, the flow channel diameter after passing the restrictor may be kept to be the same as that of the outlet of the restrictor, and the flow channel diameter of the restrictor locating in the downstream side may be further narrowed.

The introducing tube is not limited to the introducing tube arranged inside of the container and may penetrate through the container, or may be arranged outside of the container and the dispersed powder sample passing the introducing tube may be introduced into the container. In addition, a middle chamber may be formed between the sample chamber and the dispersal chamber as another chamber and the powder sample that is dispersed after passing the introducing tube may be temporarily introduced into the middle chamber and then the dispersed powder sample may be introduced into the dispersal chamber.

In order to make it easy to collect the powder sample flowing into the dispersal chamber by the collecting member, the voltage applying mechanism that applies the voltage of an electric potential reverse to that of the powder sample to the collecting member may be further comprised.

The film release member is not limited to the needle, and may be any, for example, a knife or the like as far as it can break the partition film.

The partition structure is not limited to the partition structure of the above-mentioned embodiment, and may be a partition structure wherein the introducing tube is arranged to penetrate through the container and an open/close valve is provided for the introducing tube.

In the second embodiment, the nozzle whose center axis is deviated is not limited to the nozzle of the second step, and may be the nozzle of the first step or of the third step. In the third embodiment, the position of the nozzle whose distal end is blocked may be any, however, in order to achieve both the capturing efficiency of the clumped particles and the efficiency of passing the particles whose particle diameter is small, it is preferable that the nozzle whose distal end is blocked is arranged in the first step or the second step.

A part or all of the embodiments may be variously combined without departing from the spirit of this invention.

INDUSTRIAL APPLICABILITY

In accordance with this invention, it is possible to provide a sample dispersing device whose dispersibility of the powder sample introduced into the dispersal chamber is higher than that of a conventional sample dispersing device.

The invention claimed is:

1. A sample dispersing device comprising
a container inside of which a dispersal chamber where a powder sample is dispersed is formed, and
an introducing mechanism that introduces a gas containing the powder sample from the outside of the container into the dispersal chamber based on a pressure difference between the inside and the outside of the container, wherein
the introducing mechanism comprises
an introduction pipe where the gas containing the powder sample flows, and
several restrictors arranged in the introduction pipe.

2. The sample dispersing device described in claim 1, wherein
a flow channel diameter is enlarged after a fluid passes the several restrictors in the introduction pipe, or after the flow channel diameter becomes the minimum in case that the fluid passes the several restrictors.

3. The sample dispersing device described in claim 1, further comprising
a decompressor that decompresses the inside of the dispersal chamber, wherein
the introducing mechanism further comprises
a sample chamber inside of which the powder sample and a predetermined volume of the gas are housed in a state before the powder sample is introduced into the dispersal chamber, and
a partition structure that separates the sample chamber and the dispersal chamber with a partition in a state before the powder sample is introduced into the dispersal chamber and that opens the partition between the sample chamber and the dispersal chamber in case that the powder sample is introduced.

4. The sample dispersing device described in claim 3, wherein
the partition structure comprises
a partition film that blocks an introducing aperture that is formed on the container and through which the powder sample is introduced, and
the introducing mechanism comprises
an elastic partition wall body that is arranged on the outside of the container and inside of which the sample chamber is formed, and
a film release member that is arranged on the inside of the elastic partition wall body and that contacts and breaks the partition film by transforming the elastic partition wall body.

5. The sample dispersing device described in claim 4, wherein
the partition structure comprises
a fixing member that is mounted on the outside of the container and that sandwiches a peripheral part of the partition film between a circumferential area of the introducing aperture and the fixing member,
a through bore that is formed on the fixing member to face the introducing aperture in a state wherein the fixing member is mounted on the container, and
an engaging projection that is formed on a circumference of an opening of the through bore locating on an opposite side to the container and that makes an engagement with an inner side surface of the elastic partition wall body.

6. The sample dispersing device described in claim 1, wherein
the several restrictors are nozzles that have a predetermined length in a direction of a flow and that have a part whose flow channel diameter decreases as going from a proximal end side of the introducing tube to a distal end thereof.

7. The sample dispersing device described in claim 1, wherein
one of the several restrictors forms an exhaust nozzle of the powder sample in the dispersal chamber.

8. The sample dispersing device described in claim 1, further comprising
a voltage applying mechanism that is arranged in the dispersal chamber and that applies a voltage whose potential is reverse to that of the powder sample to a collecting member that collects the powder sample.

9. The sample dispersing device described in claim 1, wherein
   at least one of the several restrictors is arranged in the introducing tube in a manner that a center axis of the restrictor is deviated from that of the other restrictors.

10. The sample dispersing device described in claim 1, wherein
   at least one of the several restrictors is a cylindrical shape whose distal end part is blocked and an aperture is formed on a side surface of the cylindrical shape.

* * * * *